(12) United States Patent
Toya et al.

(10) Patent No.: US 7,473,856 B2
(45) Date of Patent: Jan. 6, 2009

(54) STORED MATERIAL DETECTING SWITCH

(75) Inventors: Chiyoshi Toya, Aichi-ken (JP); Motomi Nojiri, Aichi-ken (JP)

(73) Assignee: Hoshizaki Denki Kabushiki Kaisha, Aichi-ken (JP)

( * ) Notice: Subject to any disclaimer, the term of this patent is extended or adjusted under 35 U.S.C. 154(b) by 504 days.

(21) Appl. No.: 11/270,580

(22) Filed: Nov. 10, 2005

(65) Prior Publication Data

US 2007/0103322 A1    May 10, 2007

(51) Int. Cl.
*H01H 35/02*    (2006.01)

(52) U.S. Cl. .............................. 200/61.2; 200/61.58 R; 200/84 R

(58) Field of Classification Search .............. 200/61.2, 200/61.21, 61.41, 61.42, 61.51, 61.52, 61.58 R, 200/61.48, 61.49, 84 R, 84 B, 84 C
See application file for complete search history.

(56) References Cited

U.S. PATENT DOCUMENTS

| | | | | |
|---|---|---|---|---|
| 3,259,714 A | * | 7/1966 | St Coeur | 200/84 B |
| 3,592,981 A | * | 7/1971 | Rule | 200/84 B |
| 3,659,064 A | * | 4/1972 | Inoue | 200/84 C |
| 3,715,533 A | * | 2/1973 | Seaton | 200/61.52 |
| 3,729,602 A | * | 4/1973 | Myers | 200/61.52 |
| 4,987,409 A | * | 1/1991 | Jackson | 340/623 |
| 5,142,108 A | * | 8/1992 | Johnston et al. | 200/84 R |
| 5,228,304 A | * | 7/1993 | Ryan | 62/129 |
| 5,473,307 A | * | 12/1995 | Lam | 340/467 |
| 5,728,987 A | * | 3/1998 | Utke | 200/84 R |
| 6,111,211 A | * | 8/2000 | Dziedzic et al. | 200/61.2 |
| 7,273,990 B2 | * | 9/2007 | Yoshida et al. | 200/61 |

* cited by examiner

*Primary Examiner*—Michael A Friedhofer
(74) *Attorney, Agent, or Firm*—Wenderoth, Lind & Ponack, L.L.P.

(57) ABSTRACT

A stored material detecting switch includes: a hollow case; stored material detecting device, accommodated in the case, for outputting a detection signal when the case is inclined at an angle equal to or more than a predetermined angle; and a suspension member for suspending the case in a storage chamber. The detection signal, which is outputted from the stored material detecting device at a time when the case is inclined at the angle equal to or greater than the predetermined angle through contact with a stored material in the storage chamber, is used to detect a storage level in the storage chamber.

9 Claims, 6 Drawing Sheets

STORED MATERIAL DETECTING SWITCH

BACKGROUND OF THE INVENTION

1. Field of the Invention

The present invention relates to a stored material detecting switch, and more particularly to a switch for detecting an ice level in an ice storage chamber.

2. Description of the Related Art

In general, in an ice making machine having a structure in which blocks of ice produced in an ice making portion are stored in an ice storage chamber, an ice storage detecting switch for detecting an ice level in the ice storage chamber to control an ice making operation in accordance with an ice storage amount is disposed. For the ice storage detecting switch of this type, there are known various mechanisms and methods. For instance, a mechanical ice storage detecting switch fitted on an inner wall surface of an ice storage chamber is disclosed in Japanese Utility Model Application Laid-open No. 54-179568. A rod member having a weight formed at its lower end is suspended in a rockable manner, and a magnet is fixed to the rod member. A reed switch detects a movement of the magnet when the weight is pressed toward the inner wall surface by blocks of ice in the ice storage chamber.

However, the rod member to which the magnet is fixed is a rigid body, so the ice storage detecting switch cannot operate normally unless the weight is pressed laterally, which may cause malfunction.

There is also known an ice storage detecting switch for detecting an ice level in a photoelectric manner. However, a light-emitting portion and a light-receiving portion or a light-reflecting portion need to be installed accurately, which involves time and effort for a fitting operation and the associated high cost.

SUMMARY OF THE INVENTION

The invention has been made to eliminate such problems. Therefore, it is an object of the present invention to provide a stored material detecting switch which is inexpensive, can be fitted easily, and enables reliable detection of a storage level regardless of a direction from which a stored material such as ice comes into contact with the stored material detecting switch.

A stored material detecting switch according to the present invention includes: a hollow case; stored material detecting means accommodated in the case, for outputting a detection signal when the case is inclined at an angle equal to or more than a predetermined angle; and suspension means for suspending the case in a storage chamber. The detection signal outputted from the stored material detecting means, at a time when the case is inclined at the angle equal to or more than the predetermined angle through contact with a stored material in the storage chamber, is used to detect a storage level in the storage chamber.

DETAILED DESCRIPTION OF THE PREFERRED EMBODIMENTS

Embodiments of the present invention will be described hereinafter with reference to the accompanying drawings.

First Embodiment

Figure 1:
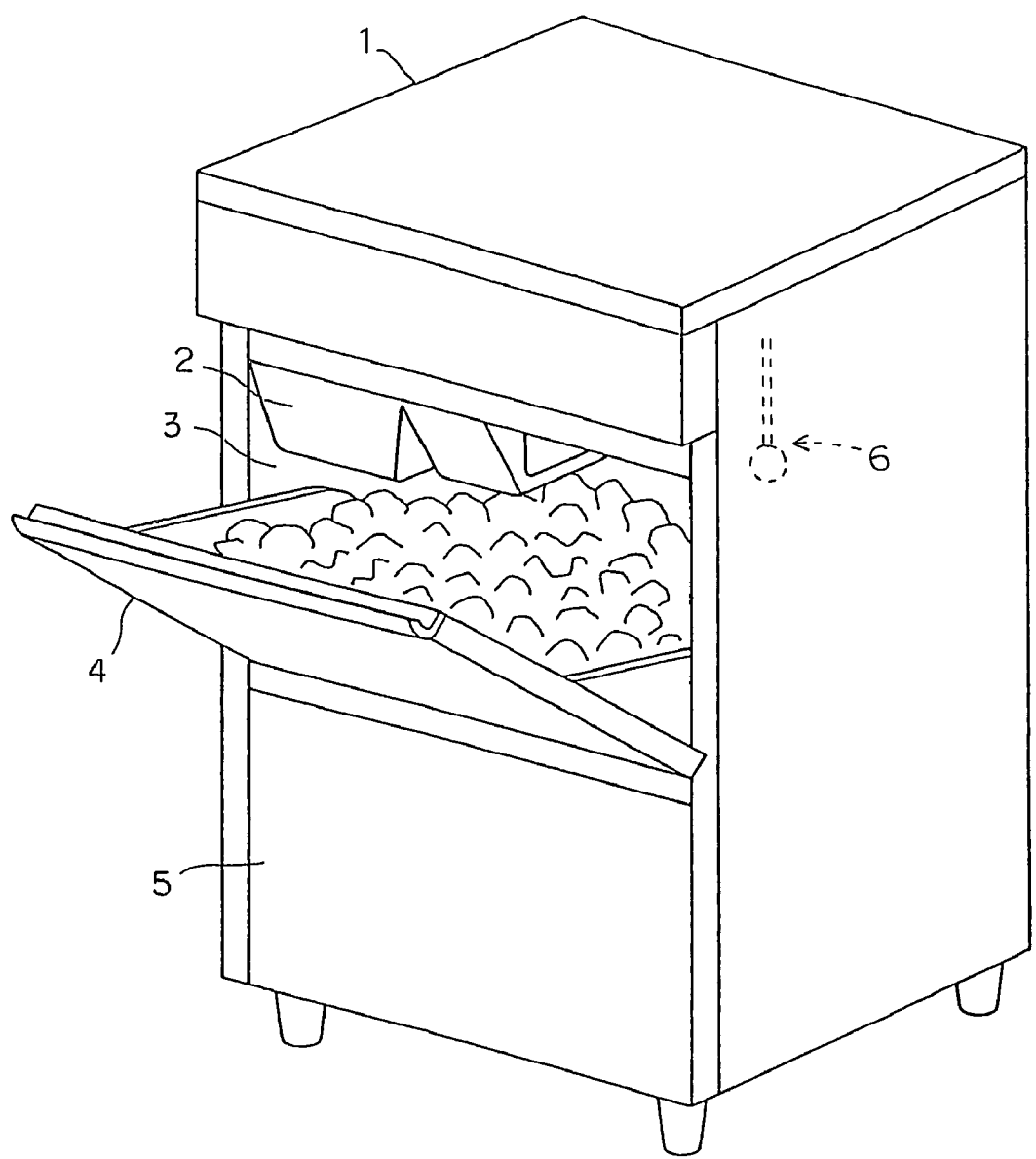
FIG. 1 is a perspective view showing an ice making machine fitted with an ice storage detecting switch according to a first embodiment of the present invention.

FIG. 1 shows an ice making machine fitted with an ice storage detecting switch according to a first embodiment of the present invention. An ice making portion 2 is disposed in an upper portion of an ice making machine body 1 having a shape of a rectangular parallelepiped, and an ice storage chamber 3 is formed below the ice making portion 2. An opening/closing door 4 is provided in front of the ice storage chamber 3, and blocks of ice in the ice storage chamber 3 can be taken out by opening the opening/closing door 4. A machinery chamber 5 for accommodating a compressor forming a refrigeration circuit and the like is disposed below the ice storage chamber 3.

The blocks of the ice produced in the ice making portion 2 are sequentially stored in the ice storage chamber 3. A ceiling portion of the ice storage chamber 3 is fitted with an ice storage detecting switch 6. When an ice level in the ice storage chamber 3 rises to reach the ice storage detecting switch 6, a detection signal is outputted from the ice storage detecting switch 6 to thereby stop an ice making operation.

Figure 2:
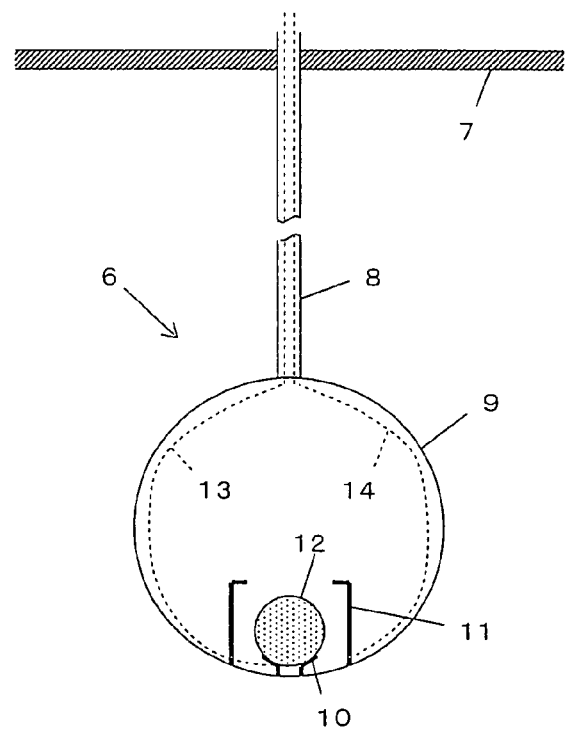
FIG. 2 is a sectional view showing the ice storage detecting switch according to the first embodiment of the present invention.

As shown in FIG. 2, the ice storage detecting switch 6 has a hollow and sealed resin ball 9 that is suspended from the ceiling portion 7 of the ice storage chamber 3 by means of a silicon tube 8. An annular ball receiver 10 is fixed to a bottom portion in the resin ball 9, and an annular peripheral wall 11, which is slightly spaced apart from the ball receiver 10, is fixed on an outer peripheral region thereof. The ball receiver 10 and the peripheral wall 11 are each formed of a conductive material such as a metal and constitute a first electrode and a second electrode, respectively. A ball 12, which has a diameter slightly smaller than an inner diameter of the peripheral wall 11 and is formed of a conductive material such as a metal, is laid on the ball receiver 10 in a rollable manner.

Signal wires 13 and 14 are electrically connected to the ball receiver 10 and the peripheral wall 11, respectively, drawn out above the ceiling portion 7 from the inside of the resin ball 9 through the silicon tube 8, and connected to an ice making control portion (not shown). The silicon tube 8 exhibits flexibility. As shown in FIG. 2, the silicon tube 8 usually hangs vertically downward due to the weight of the resin ball 9, which is held in a non-inclined state. In this state, the ball 12 is supported on a center of the ball receiver 10 and is not in contact with the peripheral wall 11. Accordingly, the ball receiver 10 and the peripheral wall 11 are electrically insulated from each other.

The resin ball 9, the silicon tube 8, the ball 12 form a case, suspension means, and a conductive member of the present invention, respectively. The ball receiver 10, the peripheral wall 11, and the ball 12 form stored material detecting means of the present invention.

Next, an operation of the ice storage detecting switch 6 according to the first embodiment of the present invention will be described. When an ice level in the ice storage chamber 3 is lower than an installation height of the resin ball 9 and no external force is applied to the resin ball 9 from the blocks of the ice, the resin ball 9 hangs vertically downward because of its own weight, thereby establishing an OFF state in which the ball receiver 10 and the peripheral wall 11 are electrically insulated from each other.

Figure 3:
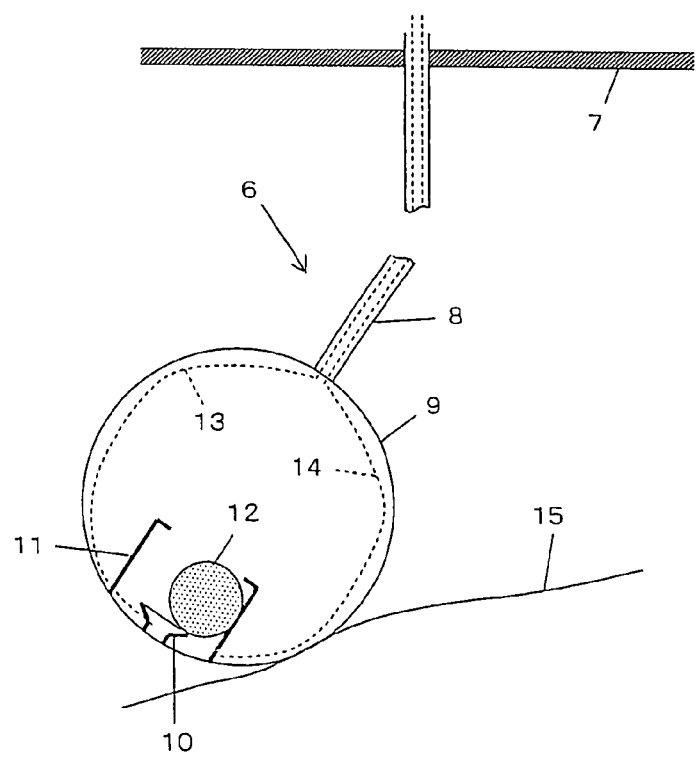
FIG. 3 is a sectional view showing the ice storage detecting switch according to the first embodiment of the present invention which is in the process of detecting an ice level.

When the ice level in the ice storage chamber 3 rises to reach the installation height of the resin ball 9 due to the progress of production of ice by the ice making portion 2, the resin ball 9 rides on the blocks of the ice 15 to incline as shown in FIG. 3. When the inclination angle of the resin ball 9 becomes equal to or larger than a predetermined angle, the ball 12 rolls on the ball receiver 10 and then comes into contact with both the ball receiver 10 and the peripheral wall 11. As a result, an ON state is established in which the ball receiver 10 and the peripheral wall 11 are electrically connected to each other, and a detection signal is outputted. The ice making control portion stops the ice making operation based on the detection signal. After that, when the ice level in the ice storage chamber 3 is lowered by opening the opening/closing door 4 and taking out the blocks of the ice from the ice storage chamber 3, the resin ball 9 is no longer inclined. Therefore, the ice storage detecting switch 6 is turned OFF again, and the ice making control portion resumes the ice making operation.

In the above-mentioned first embodiment, the ball receiver 10 and the peripheral wall 11 respectively constituting the first electrode and the second electrode get into the OFF state in which they are electrically insulated from each other when the resin ball 9 hangs vertically downward without being inclined, and into the ON state in which they are electrically connected to each other when the resin ball 9 is inclined at an angle equal to or more that the predetermined angle. Conversely, it is also possible to establish the ON state in which they are electrically connected to each other when the resin ball 9 is not inclined, and the OFF state in which they are electrically insulated from each other when the resin ball 9 is inclined at an angle equal to or more than the predetermined angle.

Second Embodiment

Figure 4:
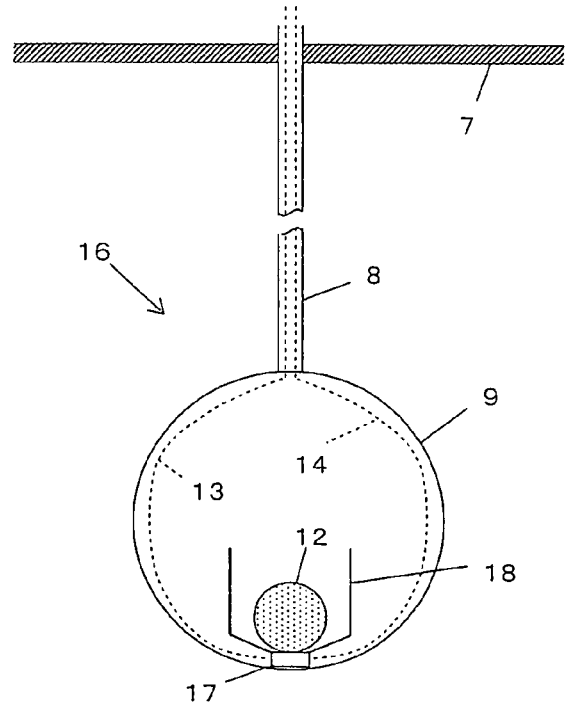
FIG. 4 is a sectional view showing an ice storage detecting switch according to a second embodiment of the present invention.

FIG. 4 shows an ice storage detecting switch 16 according to the second embodiment of the present invention. This ice storage detecting switch 16 is obtained by modifying the ice storage detecting switch 6 of the first embodiment shown in FIG. 2 such that, instead of employing the ball receiver 10 and the peripheral wall 11 fixed in the resin ball 9, a proximity switch 17 is fixed to the bottom portion of the resin ball 9, an annular guide 18 is fixed to an outer peripheral portion of the proximity switch 17, and the ball 12 formed of a conductive material is laid on the proximity switch 17 in a rollable manner. The guide 18 has an inner diameter larger than the diameter of the ball 12, and the signal wires 13 and 14 are connected to the proximity switch 17.

The proximity switch 17 outputs an ON signal via the signal wires 13 and 14 when the ball 12 is located in proximity thereto, and outputs an OFF signal when the ball 12 moves away therefrom. In the second embodiment of the present invention, the ball 12 and the proximity switch 17 form the stored material detecting means.

When an ice level in the ice storage chamber 3 is lower than an installation height of the resin ball 9 and no external force is applied to the resin ball 9 from the blocks of the ice, the resin ball 9 hangs vertically downward because of its own weight without being inclined. In this state, the ball 12 is located in proximity to the proximity switch 17, so an ON signal is outputted therefrom.

Figure 5:
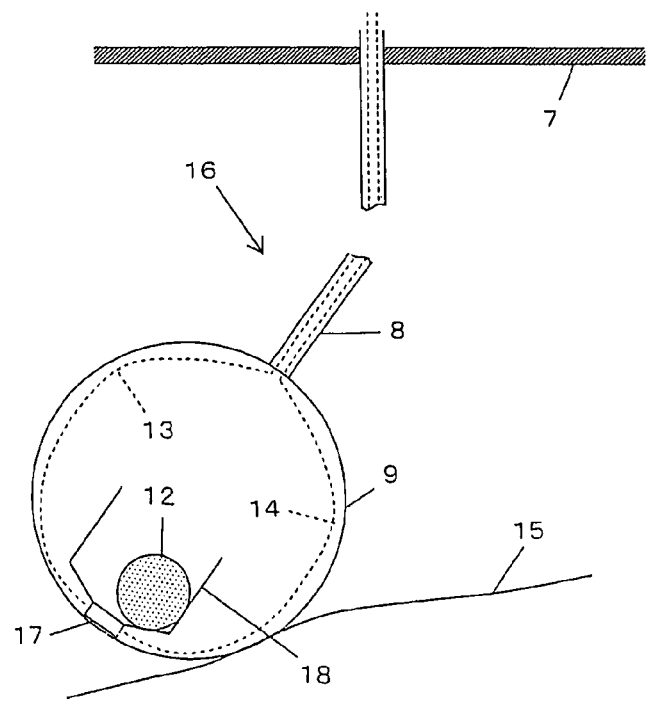
FIG. 5 is a sectional view showing the ice storage detecting switch according to the second embodiment of the present invention which is in the process of detecting an ice level.

On the other hand, when the ice level in the ice storage chamber 3 rises to reach the installation height of the resin ball 9 due to the progress of production of ice by the ice making portion 2, the resin ball 9 rides on the block of the ice 15 and is inclined as shown in FIG. 5. When the inclination angle of the resin ball 9 becomes equal to or larger than a predetermined angle, the ball 12 rolls and moves away from the proximity switch 17. Thus, an OFF signal is outputted from the proximity switch 17, and the ice making operation of the ice making machine is stopped based on this signal. After that, when the ice level in the ice storage chamber 3 is lowered by opening the opening/closing door 4 and taking out the blocks of the ice from the ice storage chamber 3, the resin ball 9 is no longer inclined. Therefore, the ball 12 is guided by the guide 18 and is then located directly on the proximity switch 17, so an ON signal is outputted from the proximity switch 17 again.

In the above-mentioned second embodiment, the ball 12 is located in proximity to the proximity switch 17 and an ON signal is outputted therefrom when the resin ball 9 is not inclined, and the ball 12 is spaced apart from the proximity switch 17 and an OFF signal is outputted therefrom when the resin ball 9 is inclined at an angle equal to or more than the predetermined angle. Conversely, another construction is also possible in which the ball 12 is spaced apart from the proximity switch 17 and an OFF signal is outputted therefrom when the resin ball 9 is not inclined, and that the ball 12 is located in proximity to the proximity switch 17 and an ON signal is outputted therefrom when the resin ball 9 is inclined at an angle equal to or more than the predetermined angle.

Third Embodiment

Figure 6:
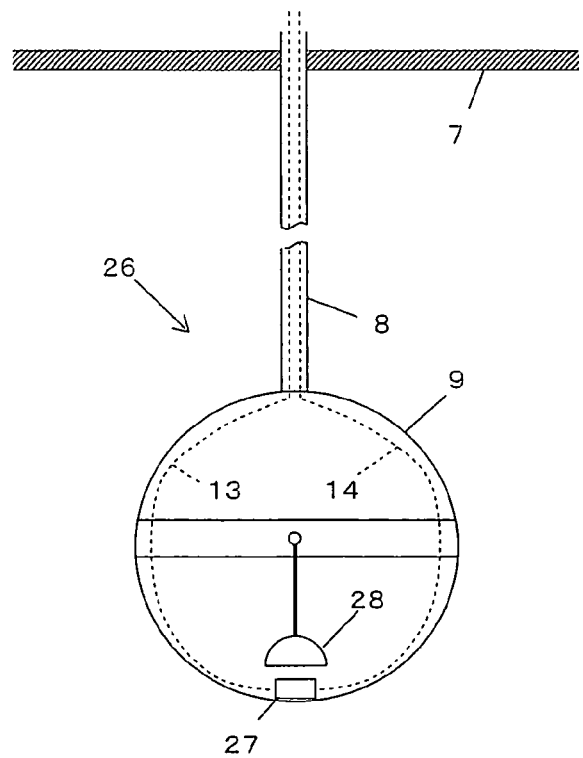
FIG. 6 is a sectional view showing the ice storage detecting switch according to a third embodiment of the present invention.

FIG. 6 shows an ice storage detecting switch 26 according to the third embodiment of the present invention. This ice storage detecting switch 26 is obtained by modifying the ice storage detecting switch 6 of the first embodiment shown in FIG. 2 such that, instead of employing the ball receiver 10, the peripheral wall 11, and the ball 12 provided in the resin ball 9, a reed switch 27 is fixed to the bottom portion of the resin ball 9 and a magnet 28 is suspended in the resin ball 9 in a rockable manner so as to be located in proximity to the reed switch 27 when the resin ball 9 is not inclined. The signal wires 13 and 14 are connected to the reed switch 27.

The reed switch 27 outputs an ON signal via the signal wires 13 and 14 when the magnet 28 is located in proximity thereto, and outputs an OFF signal when the magnet 28 moves away therefrom. In the third embodiment of the present invention, the reed switch 27 and the magnet 28 form the storage material detecting means.

When an ice level in the ice storage chamber 3 is lower than an installation height of the resin ball 9 and no external force is applied to the resin ball 9 from the blocks of the ice, the resin ball 9 hangs vertically downward because of its own weight without being inclined. In this state, the magnet 28 is located in proximity to the reed switch 27, so an ON signal is outputted therefrom.

Figure 7:
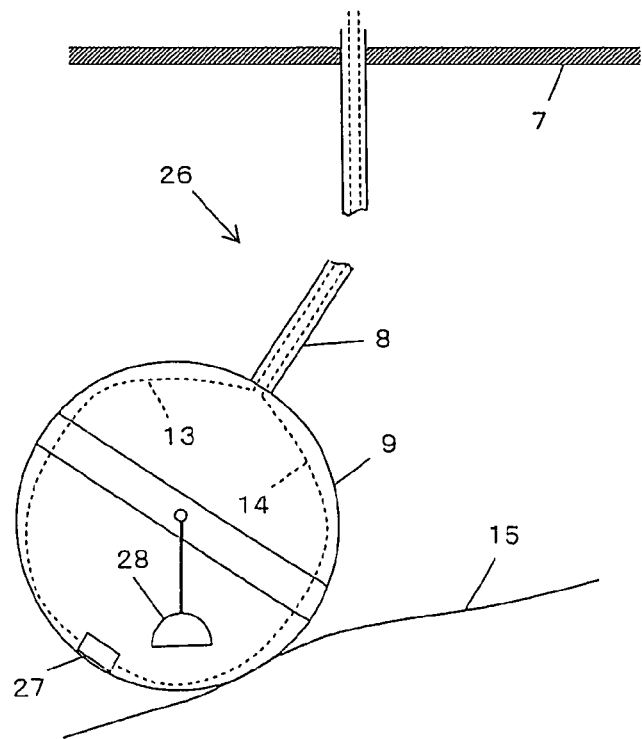
FIG. 7 is a sectional view showing the ice storage detecting switch according to the third embodiment of the present invention which is in the process of detecting an ice level.

On the other hand, when the ice level in the ice storage chamber 3 rises to reach the installation height of the resin ball 9 due to the progress of production of ice by the ice making portion 2, the resin ball 9 rides on the block of the ice 15 so as to be inclined as shown in FIG. 7. When the inclination angle of the resin ball 9 becomes equal to or larger than a predetermined angle, the magnet 28 swings away from the reed switch 27. Thus, an OFF signal is outputted from the reed switch 27, and the ice making operation of the ice making machine is stopped based on this signal. After that, when the ice level in the ice storage chamber 3 is lowered by opening the opening/closing door 4 and taking out the blocks of the ice from the ice storage chamber 3, the resin ball 9 is no longer inclined. Therefore, the magnet 28 is located in proximity to the reed switch 27, and an ON signal is outputted from the reed switch 27 again.

In the above-mentioned third embodiment, the magnet 28 is located in proximity to the reed switch 27 and an ON signal is outputted therefrom when the resin ball 9 is not inclined, and the magnet 28 is spaced apart from the reed switch 27 and an OFF signal is outputted therefrom when the resin ball 9 is inclined at an angle that is equal to or greater than the predetermined angle. Conversely, a construction is also possible in which the magnet 28 is spaced apart from the reed switch 27 and an OFF signal is outputted therefrom when the resin ball 9 is not inclined, and the magnet 28 is located in proximity to the reed switch 27 and an ON signal is outputted therefrom when the resin ball 9 is inclined at an angle equal to or more than the predetermined angle.

In the foregoing first to third embodiments, the resin ball 9 is suspended in the ice storage chamber 3 by means of the silicon tube 8 exhibiting flexibility, so the resin ball 9 is inclined no matter from which direction the blocks of the ice come into contact therewith. As a result, the stored material detecting means inside the resin ball 9 can reliably detect the ice level. Even when a shovel or the like abuts the resin ball 9 in opening the opening/closing door 4 to take out the blocks of the ice from the ice storage chamber 3, the resin ball 9 can escape in any direction due to the flexible silicon tube 8 and does not become an obstacle.

Furthermore, the resin ball 9 is suspended by means of the silicon tube 8 through which the signal wires 13 and 14 are passed, so it can be easily fitted in the ice storage chamber 3.

Fourth Embodiment

Figure 8:
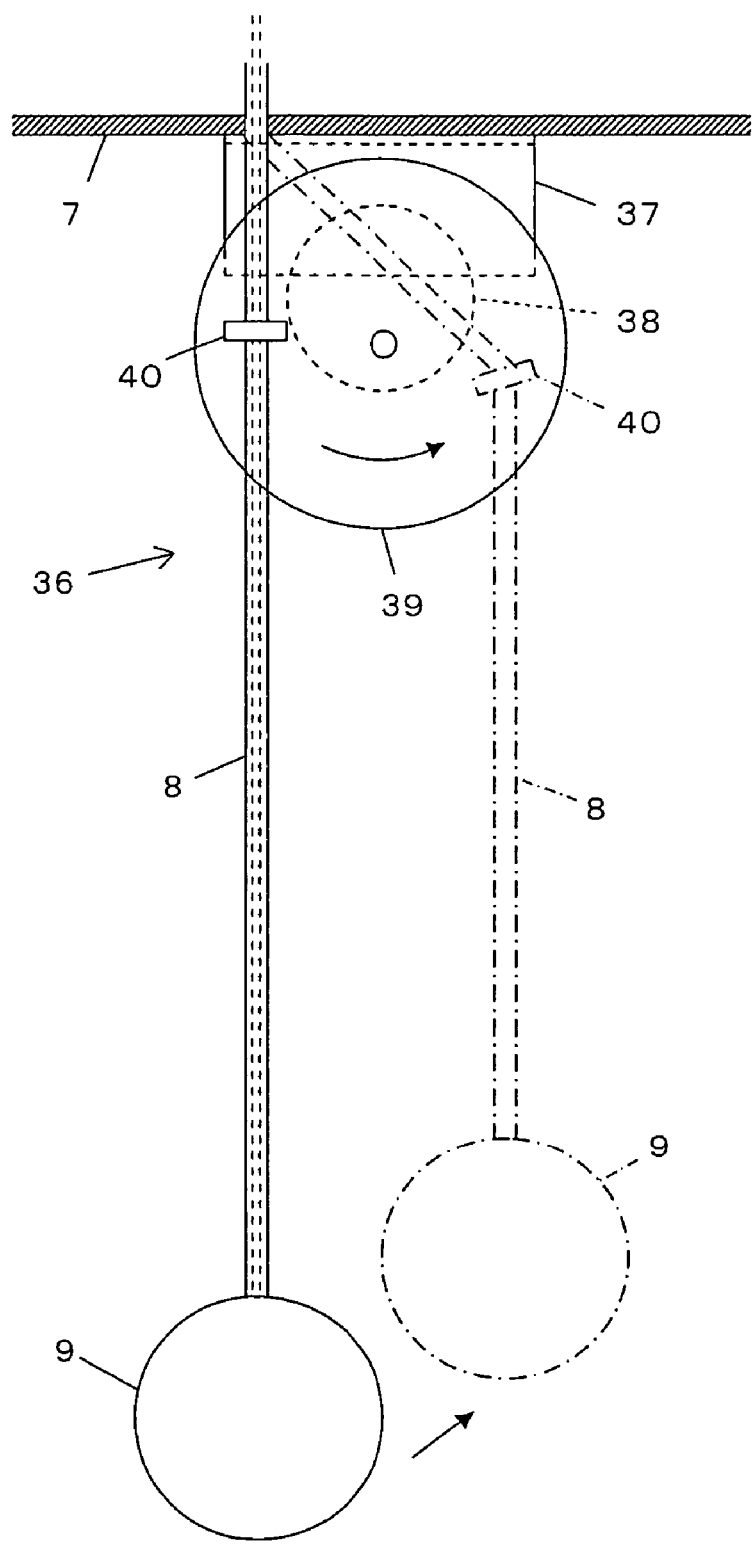
FIGS. 8 and 9 area front sectional view and a lateral sectional view showing an ice storage detecting switch according to a fourth embodiment of the present invention, respectively.
Figure 9:
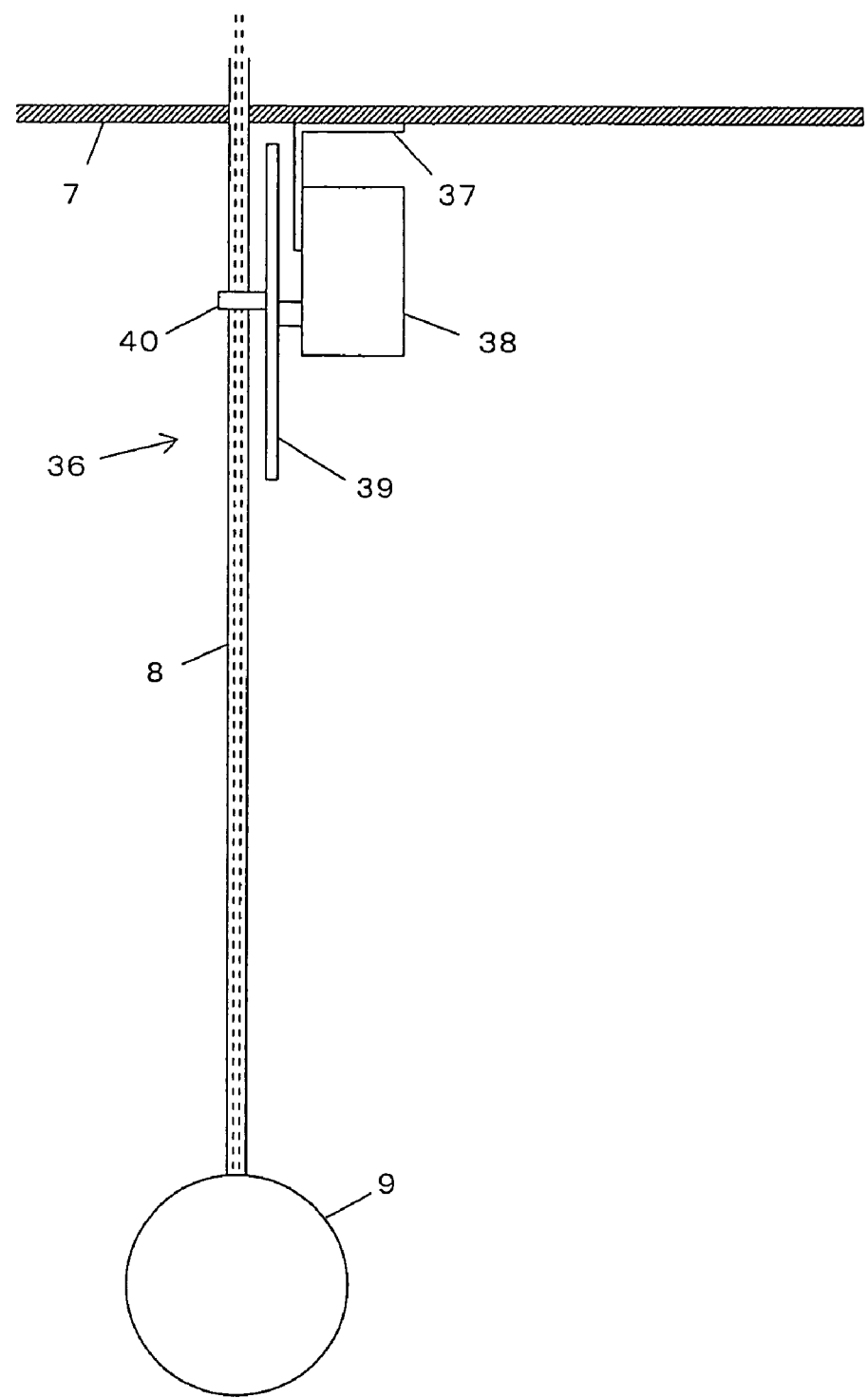

FIGS. 8 and 9 each show an ice storage detecting switch 36 according to the fourth embodiment of the present invention. This ice storage detecting switch 36 is obtained by further providing the ice storage detecting switch of the first, second, or third embodiment with moving means for forcibly moving the resin ball 9 inside the ice storage chamber 3 by moving the silicon tube 8. A motor 38 is fixed to the ceiling portion 7 of the ice storage chamber 3 via a bracket 37, and a rotary plate 39 is fitted to a rotational shaft of the motor 38. The rotary plate 39 is provided, at a position that is offset from the rotational shaft of the motor 38, with a rotatable fulcrum member 40, and the silicon tube 8 is slidably passed through a through-hole formed in the fulcrum member 40.

When the motor 38 is driven so as to rotate the rotary plate 39, the fulcrum member 40 rotates together with the rotary plate 39. In response to this rotation of the fulcrum member 40, as indicated by alternate long and short dashed lines in FIG. 8, the silicon tube 8 flexes and the resin ball 9 moves vertically and horizontally. The motor 38, the rotary plate 39, and the fulcrum member 40 form the moving means.

During the ice making operation, the blocks of the ice are stored in the ice storage chamber 3 while the resin ball 9 is slowly moved by driving the motor 38. When the ice level in the ice storage chamber 3 rises to reach the installation height of the resin ball 9 due to the progress of production of ice, the blocks of the ice come into contact with the resin ball 9. However, the resin ball 9 slowly moves vertically and horizontally, so it rides on the blocks of the ice, while being nearly embedded in the blocks of the ice, and is then gradually inclined. When the resin ball 9 is thus inclined at an angle equal to or more than the predetermined angle, and a detection signal is continuously outputted from the stored material detecting means inside the resin ball 9 for a certain period, for example, 15 seconds, the ice making control portion (not shown) determines that the ice level in the ice storage chamber 3 has reached a predetermined ice level, and stops the ice making operation and the driving of the motor 38. After that, when the ice level in the ice storage chamber 3 is lowered by opening the opening/closing door 4 and taking out the blocks of the ice from the ice storage chamber 3, and the detection signal outputted from the stored material detecting means remains canceled continuously for, for example, 30 seconds after the resin ball 9 is returned to a non-inclined state, the ice making control portion determines that the ice level has lowered, resumes the ice making operation and drives the motor 38 to move the resin ball 9 again.

In the fourth embodiment of the present invention, the blocks of the ice are stored while slowly moving the resin ball 9, so the resin ball 9 is not embedded in the blocks of the ice even when they are produced as tiny flakes. As a result, the ice level can be detected reliably.

It is preferable to slowly move the resin ball 9, so the motor 38 operates at a low rotational speed and at a small torque. Therefore, a compact and inexpensive motor can be used as the motor 38.

In the aforementioned first to fourth embodiment, the silicon tube 8 for suspending the resin ball 9 is fixed by being passed through the through-hole formed in the ceiling portion 7 of the ice storage chamber 3. However, if the silicon tube 8 is made slidable with respect to the through-hole and the installation height of the resin ball 9 is made to be adjustable, the ice level to be detected can be changed with ease.

Instead of the silicon tube 8, a coil spring, a chain, or the like can also be used as the flexible suspension means for suspending the resin ball 9.

In the aforementioned first to fourth embodiments, the ice level in the ice storage chamber 3 is detected. However, the present invention is not limited to detection of an ice level but is widely applicable to detection of various stored materials including, for example, powder materials or particulate members.

In the aforementioned first to fourth embodiments, the sealed resin ball 9 is used as a case. However, the resin ball 9 is not necessarily sealed when a certain type of stored material is stored or when the case has a certain internal structure. In such cases, a ball made of a material other than resin can be used.

As described above, according to the present invention, the stored material detecting means is accommodated in the case suspended in the storage chamber by means of the suspension means, and a detection signal is outputted from the stored material detecting means when the case is inclined at an angle equal to or more than a predetermined angle. Therefore, when the stored material comes into contact with the case, the case is inclined regardless of the direction in which the stored material comes into contact therewith, so it is possible to detect a storage level reliably. Due to structural simplicity, the stored material detecting switch of the present invention is inexpensive and can be fitted easily.

What is claimed is:

1. A stored material detecting switch comprising:
    a hollow case;
    stored material detecting means, accommodated in the case, for outputting a detection signal when the case is inclined at an angle to or greater than a predetermined angle;
    flexible suspension means for suspending the case in a storage chamber; and
    moving means for moving the case in the storage chamber by moving the suspension means,
    wherein the detection signal is outputted from the stored material detecting means at a time when the case is inclined at the angle equal to or greater than the predetermined angle through contact with a stored material in the storage chamber being used to detect a storage level in the storage chamber,
    wherein the moving means comprises a rotatable rotary plate, and a fulcrum member provided on the rotary plate at a position that is offset from the rotational axis of the rotary plate, the fulcrum member slidably supporting the suspension means and rotating together with the rotary plate when the rotary plate is rotated.

2. A stored material detecting switch according to claim 1 wherein the stored material detecting means comprises:
    a first electrode and a second electrode that are spaced slightly apart from each other and are fixed in the case; and
    a conductive member for, by its movement in the case, changing a conduction state between the first electrode and the second electrode depending on whether or not the case is inclined at the angle that is equal to or greater than the predetermined angle.

3. A stored material detecting switch according to claim 1 wherein the stored material detecting means comprises:
    a proximity switch fixed in the case; and
    a conductive member for, by its movement in the case, changing in distance from the proximity switch depending on whether or not the case is inclined at the angle that is equal to or greater than the predetermined angle.

4. A stored material detecting switch according to claim 1 wherein the stored material detecting means comprises:
    a reed switch fixed in the case; and
    a magnet movably fitted in the case, for, by its movement in the case, changing in distance from the reed switch depending on whether or not the case is inclined at the angle that is equal to or greater than the predetermined angle.

5. A stored material detecting switch comprising:
    a hollow case;
    a stored material detector accommodated in the case, the stored material detector being operable to output a detection signal when the case is inclined at an angle that is equal to greater than a predetermined angle;
    a rotatable plate that is rotatable about a rotational axis;
    a fulcrum member mounted on the rotatable plate at a position that is offset from the rotational axis of the rotatable plate; and
    a flexible tube for suspending the case in a storage chamber, the flexible tube being slidably connected to the fulcrum member so that the case is moved in the storage chamber upon rotation of the rotatable plate,
    wherein the detection signal is outputted from the stored material detector when the case is inclined at an angle that is equal to or greater than the predetermined angle through contact with a stored material in the storage chamber, the detection signal being indicative of a storage level of the stored material in the storage chamber.

6. A stored material detecting switch according to claim 5, further comprising a motor, wherein the rotatable plate is secured to a rotational shaft of the motor.

7. A stored material detecting switch according to claim 5, wherein the stored material detector comprises:
    a first electrode and a second electrode that are spaced slightly apart from each other and are fixed in the case; and
    a conductive member for, by its movement in the case, changing a conduction state between the first electrode and the second electrode depending on whether or not the case is inclined at the angle that is equal to or greater than the predetermined angle.

8. A stored material detecting switch according to claim 5, wherein the stored material detector comprises:
    a proximity switch fixed in the case; and
    a conductive member for, by its movement in the case, changing in distance from the proximity switch depending on whether or not the case is inclined at the angle that is equal to or greater than the predetermined angle.

9. A stored material detecting switch according to claim 5, wherein the stored material detector comprises:
    a reed switch fixed in the case; and
    a magnet movably fitted in the case for, by its movement in the case, changing a distance from the reed switch depending on whether or not the case is inclined at the angle that is equal to or greater than the predetermined angle.

* * * * *